United States Patent
Kustner et al.

(10) Patent No.: US 6,932,414 B2
(45) Date of Patent: Aug. 23, 2005

(54) COVERING FOR A CLAMP OF A FOLDING TOP

(75) Inventors: Markus Kustner, Ludwigsburg (DE); Horst Schmidt, Stuttgart (DE)

(73) Assignees: Dr. Ing. h.c.F. Porsche AG, Stuttgart (DE); Beatrix Gross, Stuttgart (DE)

( * ) Notice: Subject to any disclaimer, the term of this patent is extended or adjusted under 35 U.S.C. 154(b) by 0 days.

(21) Appl. No.: 10/754,636

(22) Filed: Jan. 12, 2004

(65) Prior Publication Data

US 2004/0201242 A1 Oct. 14, 2004

(30) Foreign Application Priority Data

Jan. 13, 2003 (DE) .......................................... 103 008 83

(51) Int. Cl.$^7$ .............................................. R60J 7/185
(52) U.S. Cl. .................... 296/121; 296/224; 296/107.05
(58) Field of Search ........................... 296/121, 107.01, 296/224, 136.01, 136.07, 136.08, 107.05; 292/113, 302, 256.65, 341.15, 341.16, 66, 67, 272, 273, 274, 204, DIG. 5, DIG. 30, DIG. 36, DIG. 43

(56) References Cited

U.S. PATENT DOCUMENTS

| | | | | | |
|---|---|---|---|---|---|
| 3,216,763 A | * | 11/1965 | Heincelman | ................. | 296/121 |
| 3,641,481 A | * | 2/1972 | Farrell | ......................... | 439/558 |
| 3,851,220 A | * | 11/1974 | Charles | ....................... | 361/120 |
| 4,087,141 A | * | 5/1978 | Roberts | .................... | 312/348.6 |
| 4,290,233 A | * | 9/1981 | Hubbard | ....................... | 49/383 |
| 4,664,436 A | * | 5/1987 | Eyb | ............................. | 296/121 |
| 4,819,983 A | * | 4/1989 | Alexander et al. | .......... | 296/121 |
| 4,917,415 A | * | 4/1990 | Wurl | ........................... | 292/113 |
| 5,042,869 A | * | 8/1991 | Brin | ............................ | 296/121 |
| 5,058,939 A | * | 10/1991 | Miilu | ........................... | 292/110 |
| 5,284,378 A | * | 2/1994 | Sautter, Jr. | ................... | 296/224 |
| 5,435,615 A | * | 7/1995 | Schmitz | ....................... | 296/121 |
| 5,553,412 A | * | 9/1996 | Briechle et al. | ......... | 40/124.01 |
| 5,671,966 A | | 9/1997 | Busch | | |
| 5,772,275 A | | 6/1998 | Tokarz | | |
| 5,822,186 A | * | 10/1998 | Bull et al. | ................... | 361/695 |
| 5,957,511 A | * | 9/1999 | Homann et al. | ............ | 292/196 |
| 5,979,284 A | * | 11/1999 | Granger | ....................... | 83/649 |
| 5,986,212 A | * | 11/1999 | Lhota | ......................... | 174/68.3 |
| 6,033,009 A | * | 3/2000 | Ritter et al. | ................. | 296/121 |
| 6,068,372 A | * | 5/2000 | Rousseau et al. | ........... | 347/103 |
| 6,082,879 A | * | 7/2000 | Myburgh | .................... | 362/480 |
| 6,106,038 A | * | 8/2000 | Dreher | ....................... | 293/118 |
| 6,158,786 A | * | 12/2000 | Droste et al. | ............... | 292/201 |
| 6,279,971 B1 | * | 8/2001 | Dessenberger, Jr. | ......... | 292/113 |
| 6,309,007 B1 | * | 10/2001 | Essig et al. | ................. | 296/103 |
| 6,361,086 B1 | | 3/2002 | Robbins et al. | | |
| 6,399,883 B1 | * | 6/2002 | Lhota | .......................... | 174/101 |
| 6,443,043 B1 | * | 9/2002 | Granger | ....................... | 83/649 |
| 6,520,560 B2 | * | 2/2003 | Schutt et al. | ............... | 296/121 |
| 2002/0093218 A1 | | 7/2002 | Weissmueller et al. | | |
| 2002/0185887 A1 | * | 12/2002 | Hasselgruber et al. | ...... | 296/121 |

FOREIGN PATENT DOCUMENTS

DE 4113616 C1 7/1992
DE 19721229 A1 11/1998

OTHER PUBLICATIONS

European Search Report Dated May 13, 2004.

* cited by examiner

Primary Examiner—H. Gutman
(74) Attorney, Agent, or Firm—Crowell & Moring LLP

(57) ABSTRACT

A covering shell connected with a folding top clamp by way of detents and holding noses so that, in the event of an emergency operation of the folding top, the shell can be removed from the clamp at any time.

11 Claims, 2 Drawing Sheets

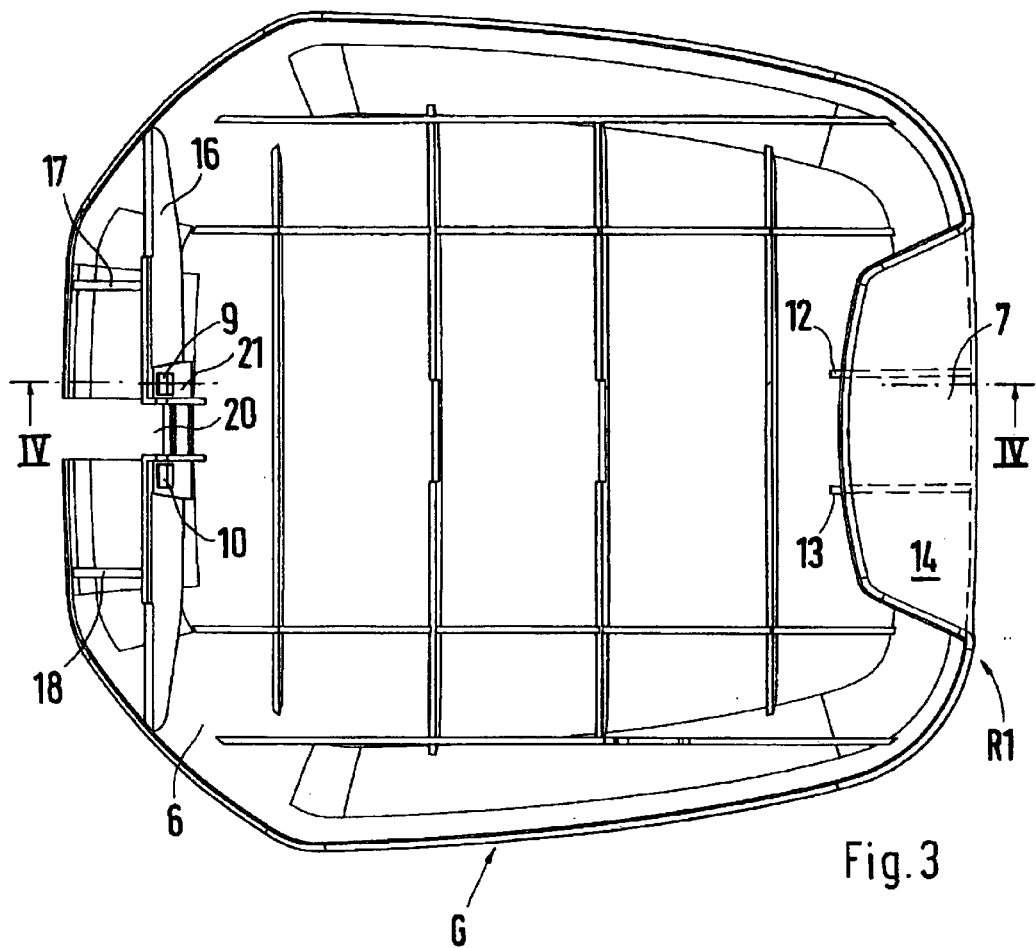
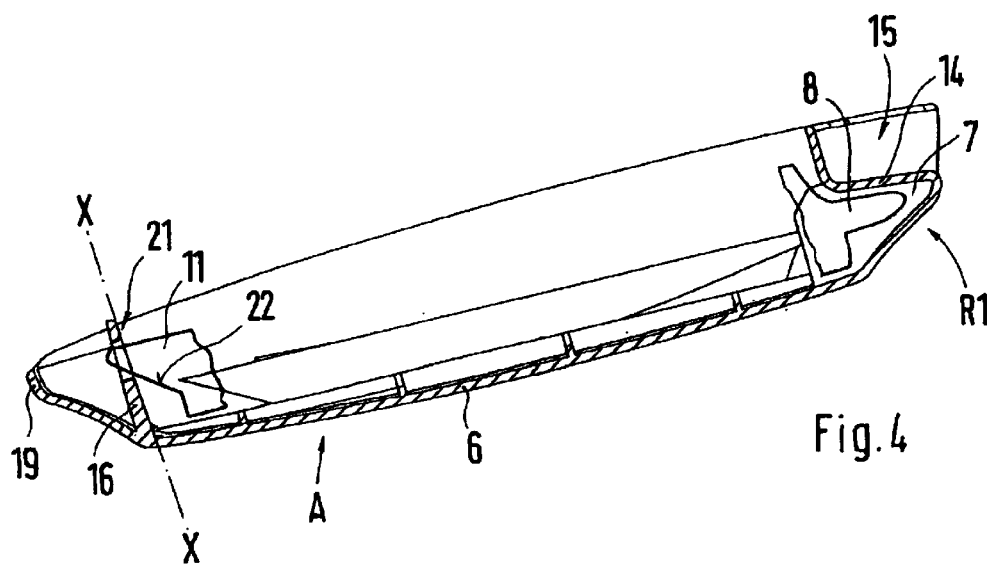
Fig. 3
Fig. 4

COVERING FOR A CLAMP OF A FOLDING TOP

BACKGROUND AND SUMMARY OF THE INVENTION

The invention relates to a covering for a clamp of a folding top in a convertible vehicle having a covering shell oriented toward the vehicle interior wherein the covering shell consists of a housing which all around encloses the folding top clamp stationarily fastened to a folding top frame, which housing can be detachably fixed to the clamp by way of a holding device and detent openings with at least one corresponding holding nose and detents on the clamp.

From German Patent Document DE 197 21 229 A1, a folding top clamp for convertible vehicles is known which is fixedly connected with a covering housing. The folding top clamp, together with the housing, is connected with a folding top frame of the vehicle by means of screwing devices which are covered by a housing plate which can be snap-fitted.

It is an object of the invention to provide a covering for a folding top clamp in a convertible vehicle which ensures an easy accessibility to the clamp.

A principal advantage of the invention is the design of the covering shell which can be detached at any time from the folding top clamp. For this purpose, the covering shell consists of a housing which completely encloses the folding top clamp and is stationarily fastened to a folding top frame. The housing, by way of a holding device and detent openings, can be detachably fixed on the clamp by means of at least one corresponding holding nose and detents.

As a result, the folding top clamp is advantageously accessible by a simple removal of the covering shell and, for example, an emergency operation of the folding top can be carried out because an operating element is connected with the clamp.

In particular, it is provided that, on a—viewed in the driving direction F—rearward edge section, the covering shell has a holding device constructed as a molded-in pocket for the clamp-side holding nose. This pocket is bounded by lateral walls which are connected with an approximately horizontally aligned overlapping wall of a recessed grip. The connection of the covering shell with the clamp first takes place by way of the clamp-side holding nose.

Furthermore, it is provided according to the invention that, viewed in the driving direction, on a forward interior transverse web at both sides of a recess, the covering shell has detent openings for the detents. A subsequent fixing of the covering shell on the clamp takes place by way of a locking of the detents into the detent openings.

So that an easy locking-in as well as a firm connection can take place between the covering shell and the clamp, the transverse web is supported by way of longitudinal webs with respect to the forward exterior edge of the covering shell, and an area between the longitudinal webs has a quasi-elastic construction. Furthermore, in the area of the detent openings, the transverse web has a plane insertion slope for the detents of the clamp. Thus, it becomes possible that the detent hooks for the fixing of the covering shell cause an optimal holding function as well as making it possible to easily remove the covering shell from the clamp.

For taking-up a covering position on the folding top clamp, by way of the holding noses, the covering shell, in an oblique position of the shell, is held inserted in the pocket and, in the covering position on the folding top clamp, the shell can be snapped by way of the detents by means of a pressing-up into the detent openings.

Other objects, advantages and novel features of the present invention will become apparent from the following detailed description of the invention when considered in conjunction with the accompanying drawings.

BRIEF DESCRIPTION OF THE DRAWINGS

FIG. 3 is an interior view of the covering shell; and

FIG. 4 is a sectional view according to Line IV—IV of FIG. 3.

DETAILED DESCRIPTION OF THE PREFERRED EMBODIMENT

Figure 1:
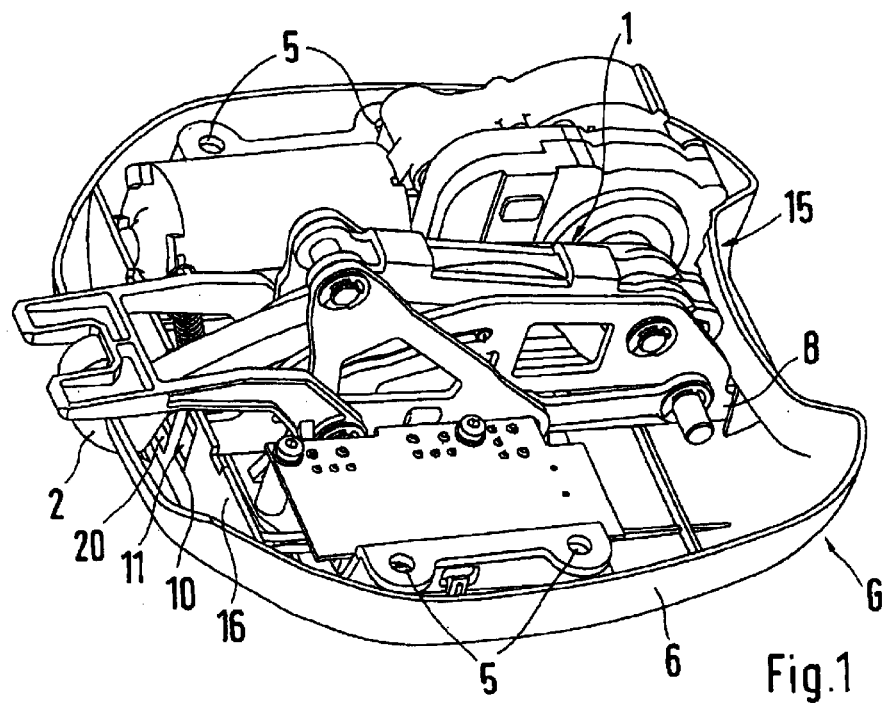
FIG. 1 is a diagrammatic representation of a folding top clamp with an attachable covering shell.
Figure 2:
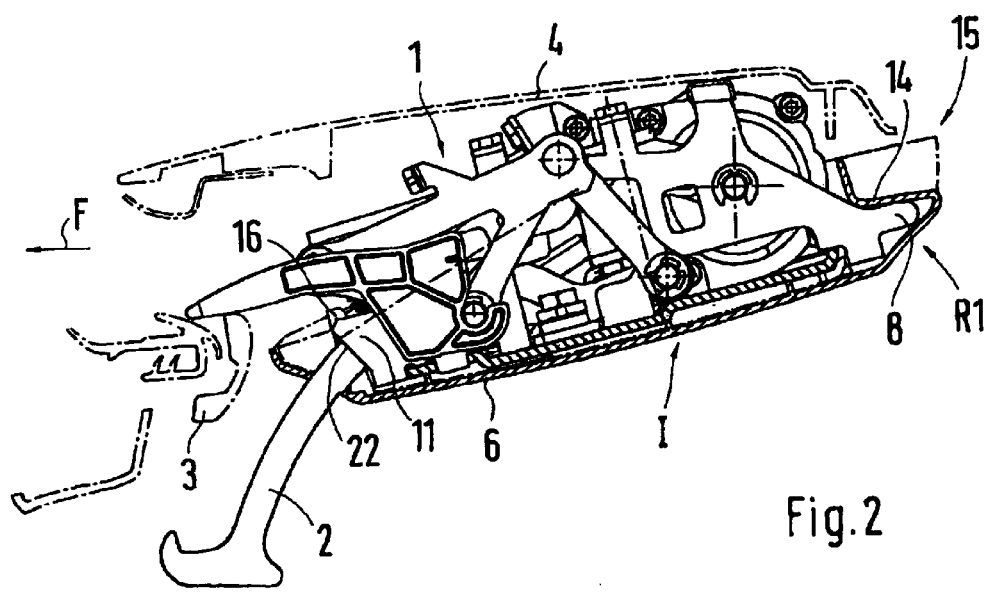
FIG. 2 is a sectional view of the folding top clamp with the holding nose and the detents.

A folding top clamp 1 is used for fixing a convertible folding top by way of a movable clamping hook 2, having a link arranged on the windshield frame 3, the clamp 1 being connected with a folding top frame 4 by way of screwing devices which are held in bores 5 of the clamp 1.

For covering the clamp 1 toward the interior of the vehicle, a covering shell 6 is provided which forms an all-around enclosing housing G for the clamp 1. The covering shell 6 comprises a holding device 7 for a clamp-side holding nose 8 as well as detent openings 9, 10 for clamp-side detents 11. The holding device 7 consists of a—viewed in the driving direction F—rearward so-called pocket in the edge section R1 of the covering shell 6 and is bounded by lateral walls 12, 13 which, on the top side, are connected with an overlapping wall 14 of a recessed grip 15. The detent openings 9, 10 are arranged in a transverse web 16 on both sides of a recess 20 for the clamping hook 2. The transverse web 16 is supported by way of longitudinal webs 17, 18 with respect to the upright exterior edge 19 of the covering shell 1. Between the longitudinal webs 17, 18, the transverse web 16 is elastically constructed to such an extent that the detents 11 can lock into the detent openings 9, 10.

So that an insertion of the detents 11 into the openings 9, 10 becomes easily possible, the openings 9, 10 are provided with a plane insertion slope 21 in the plane X—X.

For connecting the covering shell 6 with the folding top clamp 1, first, the holding nose 8 is inserted into the pocket-shaped holding device 7 in an oblique position, and then the covering shell 6 is pressed up with the forward end in the direction of the arrow A, so that the detents 11 can hook into the openings 9, 10. For this purpose, the free ends of the detents 11 are provided, for example, with a slope 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A clamp system for a folding top of a convertible vehicle, comprising:

a folding top clamp;

a folding top frame stationarily fastened to said folding top clamp;

a covering shell including a holding device and at least one detent opening for detachably fixing said covering shell to said folding top clamp with said folding top clamp including a corresponding holding nose and at least one corresponding detent wherein when said covering shell is fixed to said folding clamp said at least one detent is detachably positioned in said at least one detent opening wherein, when viewed in a driving direction (F), on a rearward edge section (R1), the covering shell includes the holding device constructed as a molded-in pocket for said holding nose.

2. The clamp system according to claim 1, the molded-in pocket is bounded by lateral walls which are connected with an approximately horizontally aligned overlapping wall of a recessed grip.

3. The clamp system according to claim 1, wherein the covering shell has the detent openings for the detents on a forward interior transverse web on both sides of a recess when viewed in a driving direction (F).

4. The clamp system according to claim 3, wherein the transverse web is supported by way of longitudinal webs with respect to a forward exterior edge of the covering shell, and an area between the longitudinal webs has an elastic construction.

5. The clamp system according to claim 3, wherein the transverse web has a plane insertion slope for the detents of the clamp in an area of the detent openings.

6. The clamp system according to claim 1, wherein, when the covering shell takes up a first covering position on the folding top clamp, the holding nose, in an oblique position of the shell, is held in the pocket in an inserted manner and the covering shell, in a second covering position on the folding top clamp, the detents are snapped into the detent openings.

7. A convertible folding top system comprising:
 a folding top clamp including at least one holding nose and at least one detent;
 a covering housing including a holding device and at least one detent opening wherein said housing is detachably fixed to said folding top clamp by the positioning of said at least one detent in a corresponding said at least one detent opening wherein said detent openings are positioned on a forward interior transverse web on both sides of a recess.

8. The arrangement according to claim 7, wherein the transverse web is supported by longitudinal webs and wherein an area between said longitudinal webs has an elastic construction.

9. The arrangement according to claim 7, wherein the transverse web has a plane insertion slope for receiving said detents in an area of the detent openings.

10. The arrangement according to claim 7, wherein the housing takes up a first covering position on the folding top clamp when the holding device is positioned in an oblique manner and inserted in a pocket and wherein the housing takes up a second position on the folding top clamp when the detents are snapped into the detent openings.

11. The arrangement according to claim 7, further including a folding top frame stationarily fastened to said folding top clamp.

* * * * *